(12) United States Patent
Tsai et al.

(10) Patent No.: US 11,548,619 B2
(45) Date of Patent: *Jan. 10, 2023

(54) EFFICIENT CRANKSHAFT

(71) Applicant: The Boeing Company, Chicago, IL (US)

(72) Inventors: Kevin R. Tsai, Seattle, WA (US); Michael Chih-Huan Wang, Seattle, WA (US)

(73) Assignee: The Boeing Company, Chicago, IL (US)

(*) Notice: Subject to any disclaimer, the term of this patent is extended or adjusted under 35 U.S.C. 154(b) by 44 days.

This patent is subject to a terminal disclaimer.

(21) Appl. No.: 17/316,355

(22) Filed: May 10, 2021

(65) Prior Publication Data
US 2021/0403144 A1 Dec. 30, 2021

Related U.S. Application Data

(60) Provisional application No. 63/044,718, filed on Jun. 26, 2020.

(51) Int. Cl.
*B64C 13/28* (2006.01)
*B64C 9/02* (2006.01)

(52) U.S. Cl.
CPC ............ *B64C 13/28* (2013.01); *B64C 9/02* (2013.01)

(58) Field of Classification Search
CPC .................................. B64C 13/28; B64C 9/02
See application file for complete search history.

(56) References Cited

U.S. PATENT DOCUMENTS

| | | | | |
|---|---|---|---|---|
| 6,299,108 B1* | 10/2001 | Lindstrom | ......... | B64D 45/0005 244/99.3 |
| 11,260,958 B2* | 3/2022 | Tsai | ......... | B64C 13/30 |
| 2017/0158348 A1* | 6/2017 | Teubner | ......... | B64C 13/50 |
| 2018/0281987 A1* | 10/2018 | Nelson | ......... | B64D 45/0005 |
| 2021/0009255 A1* | 1/2021 | Gruner | ......... | B64C 9/06 |
| 2021/0061443 A1* | 3/2021 | Dahl | ......... | B64D 29/02 |
| 2021/0114714 A1* | 4/2021 | Tsai | ......... | B64C 9/02 |
| 2021/0387716 A1* | 12/2021 | Tsai | ......... | B64C 13/30 |

\* cited by examiner

*Primary Examiner* — Rodney A Bonnette
(74) *Attorney, Agent, or Firm* — Felix L. Fischer

(57) ABSTRACT

A flap support mechanism includes a carrier beam on which a flap is mounted. The carrier beam is rotatably mounted to a flap support for rotation relative to a wing. A crankshaft assembly is rotatable about an axis and has a crankshaft eccentrically extending between an inboard cylindrical support and an outboard cylindrical support. A coupler link is rotatably engaged to the crankshaft and pivotally connected to the carrier beam. Rotation of the crankshaft from a first eccentric position to a second eccentric position translates the coupler link between a retracted position and a deployed position.

20 Claims, 15 Drawing Sheets

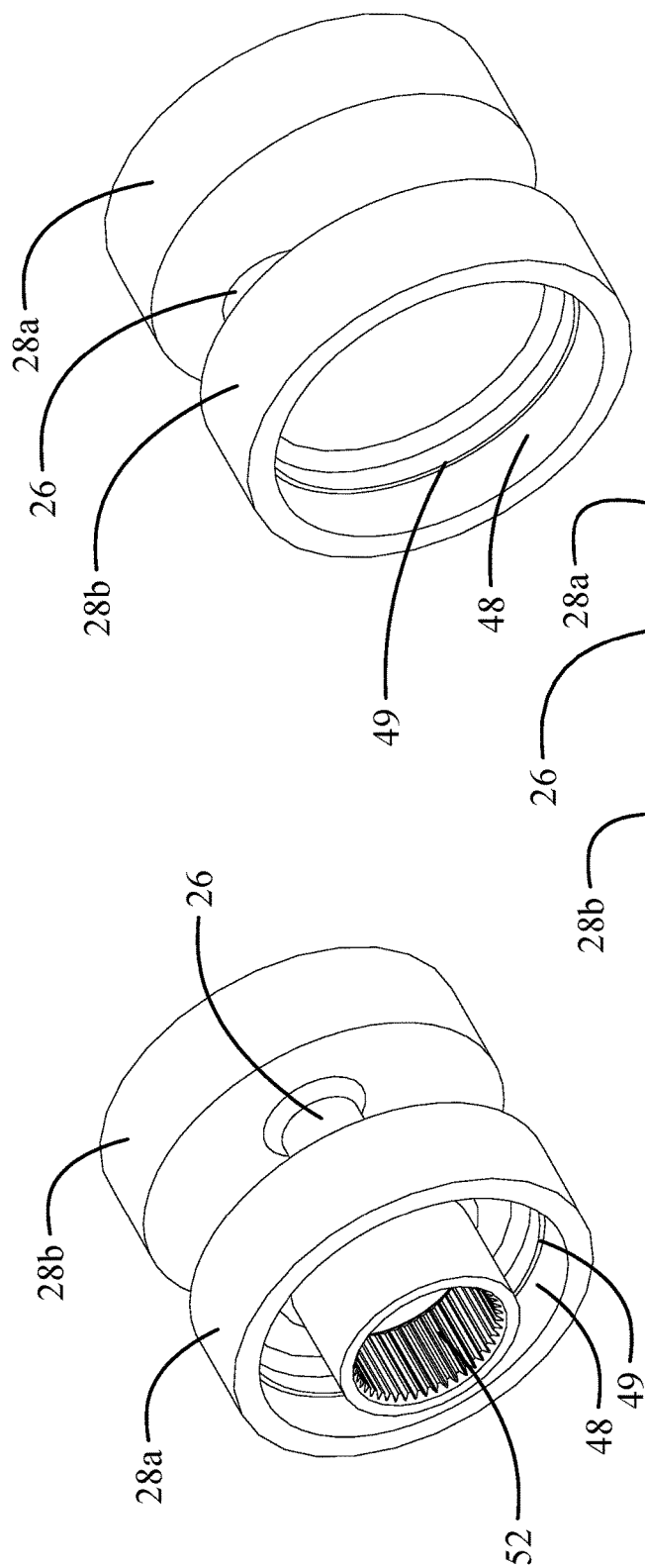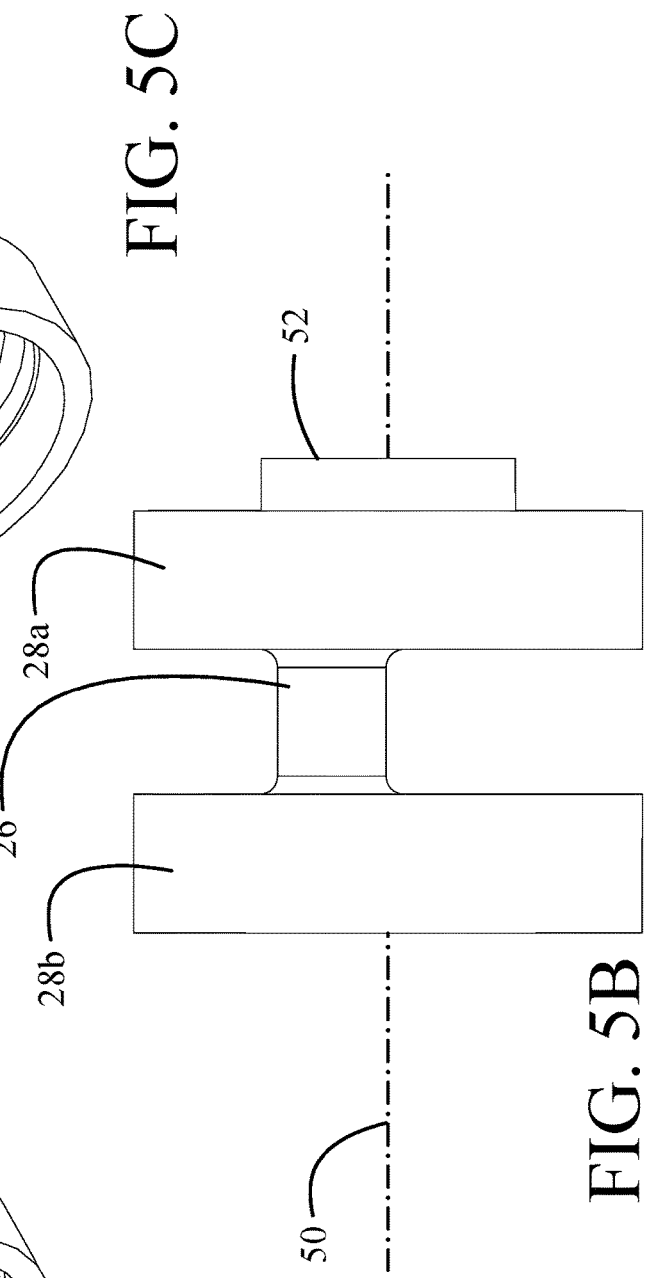
FIG. 5A FIG. 5B FIG. 5C

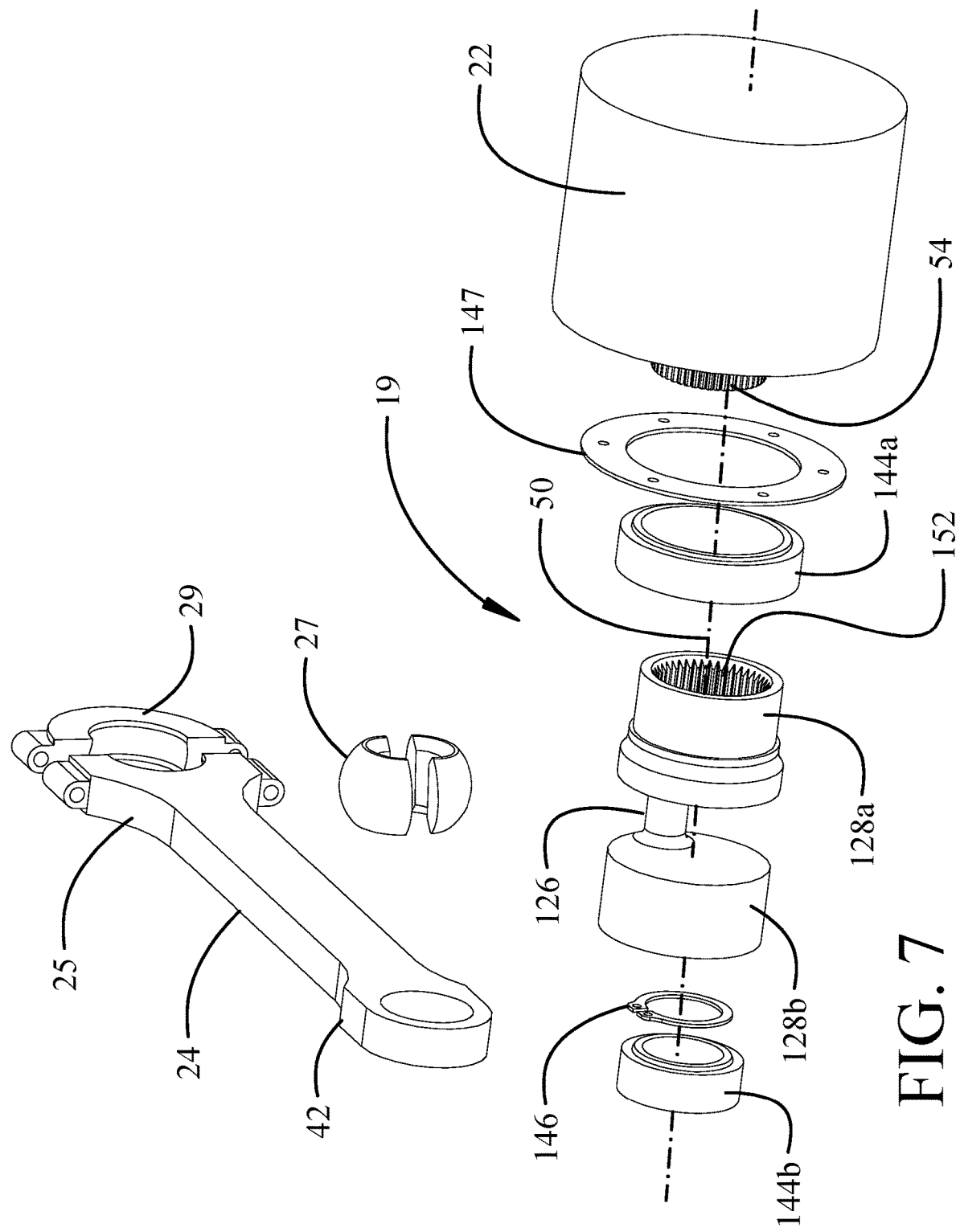

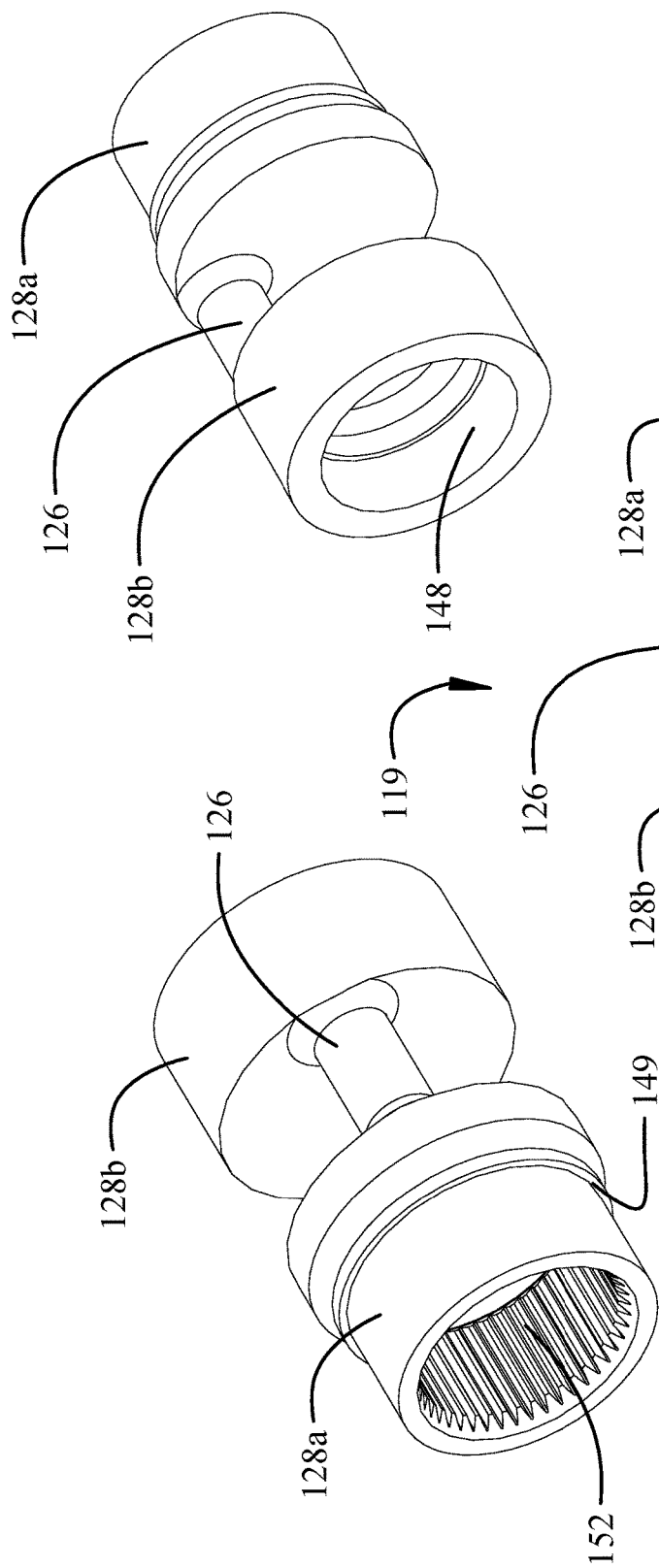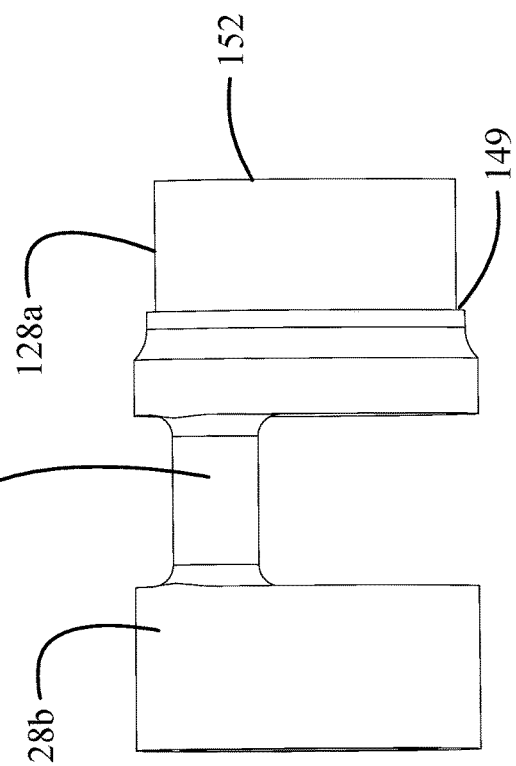

ial application Ser. No. 63/044,718 filed on Jun. 26, 2020 entitled EFFICIENT CRANKSHAFT having a common assignee with the present application, the disclosure of which is incorporated herein by reference.

BACKGROUND INFORMATION

Field

This disclosure relates generally to the field of aircraft flap systems and, more particularly to a flap actuation mechanism having a crankshaft extending between rotatable cylindrical supports providing 360° over-center rotation capability.

Background

Aircraft employ flaps which deploy to increase camber and chord of the wings for enhanced aerodynamic efficiency in take-off and landing. Various mechanical arrangements have been developed to deploy the flaps from retracted to extended positions. Flap actuation mechanisms in many applications employ actuators having a crank arm driving a linkage to the flap mounting structure. These mechanisms may have clearance issues and cannot drive the crank arm over-center. Additionally, mechanical inefficiency and suboptimal actuator loads may be present in such mechanisms.

SUMMARY

Exemplary implementations of a flap support mechanism include a carrier beam on which a flap is mounted. The carrier beam is rotatably mounted to a flap support for rotation relative to a wing. A crankshaft assembly is rotatable about an axis and has a crankshaft eccentrically extending between an inboard cylindrical support and an outboard cylindrical support. A coupler link is rotatably engaged to the crankshaft and pivotally connected to the carrier beam. Rotation of the crankshaft from a first eccentric position to a second eccentric position translates the coupler link between a retracted position and a deployed position.

The exemplary implementations provide a method for deploying a flap. A crankshaft assembly having a crankshaft eccentrically mounted between cylindrical supports is rotated in a first direction about a rotational axis. A coupler link rotatably engaged to the crankshaft and pivotally engaged to a carrier beam with an attached flap, is translated as the crankshaft is eccentrically rotated about the axis over a range from a first eccentric position of the crankshaft toward a second eccentric position of the crankshaft.

BRIEF DESCRIPTION OF THE DRAWINGS

The features, functions, and advantages that have been discussed can be achieved independently in various implementations or may be combined in yet other implementations further details of which can be seen with reference to the following description and drawings.

FIGS. 5A, 5B and 5C are an inboard pictorial view, aft view and outboard pictorial view of the crankshaft assembly in the first implementation;

FIG. 7 is an exploded view of the crankshaft assembly, coupler link and rotary actuator for a second implementation;

FIGS. 8A, 8B and 8C are an inboard pictorial view, aft view and outboard pictorial view of the crankshaft assembly in the second implementation;

DETAILED DESCRIPTION

The implementations described herein provide a crankshaft eccentrically extending between spaced-apart cylindrical supports about a rotation axis, the crankshaft connected to a coupler link such that rotation of the cylindrical supports translates the coupler link for deployment and retraction of a flap. Rotation of the crankshaft from a first eccentric position aligned with the coupler link to a second eccentric position aligned with the coupler link rotates a flap between a stowed and a fully deployed position.

Figure 1A:
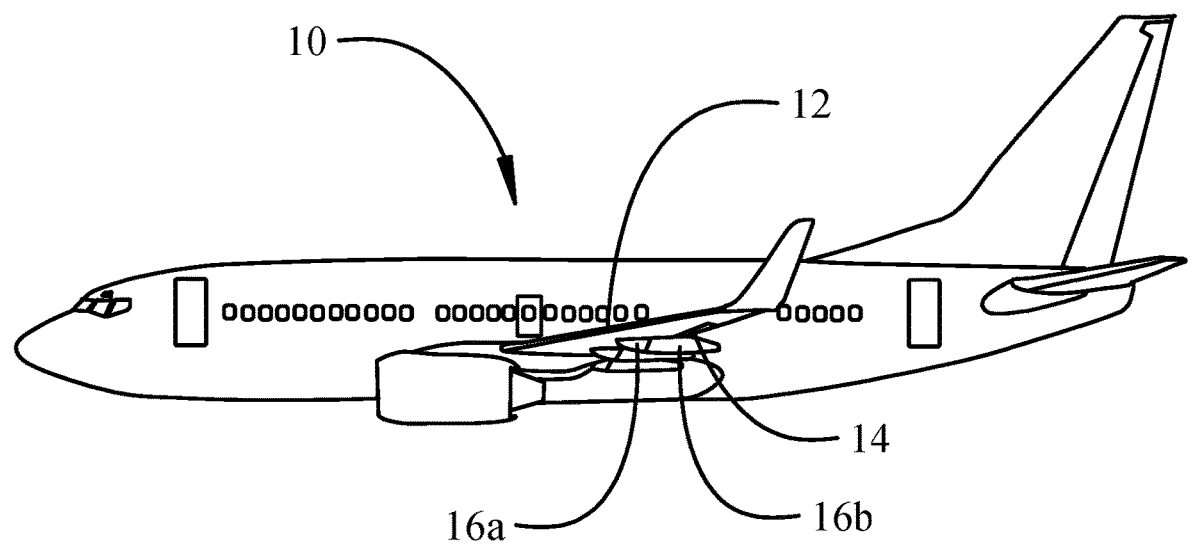
FIG. 1A is a representation of an aircraft in which the implementations disclosed herein may be employed.
Figure 1B:
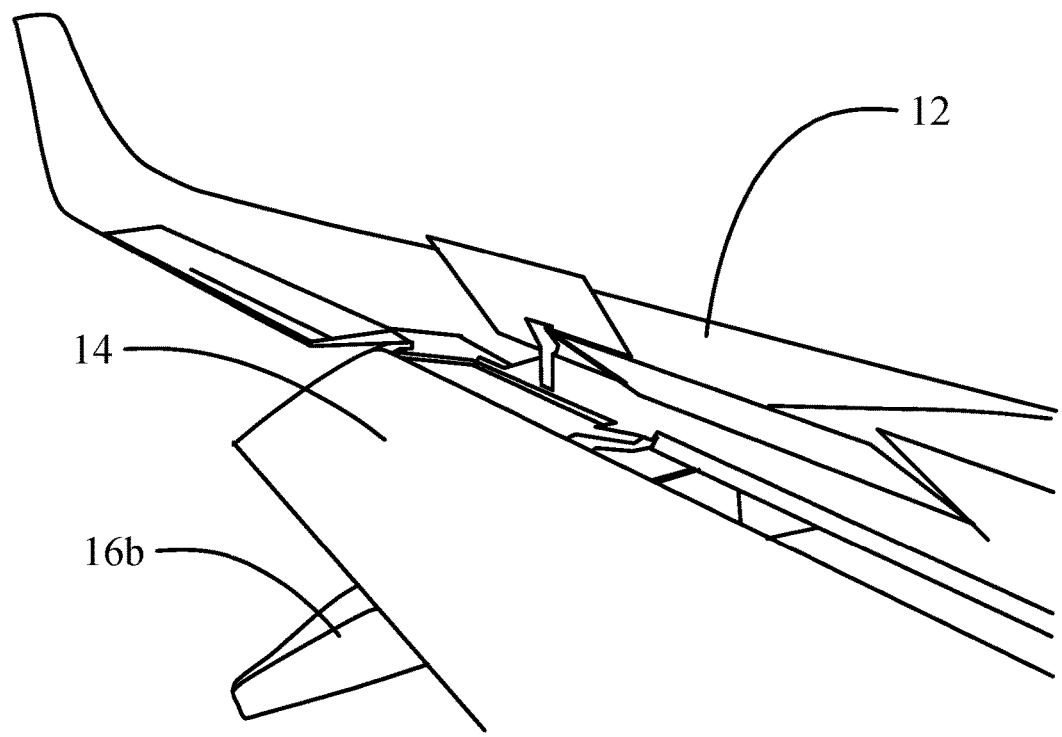
FIG. 1B is pictorial representation of the aircraft wing with the flaps and air brakes deployed.
Figure 1C:
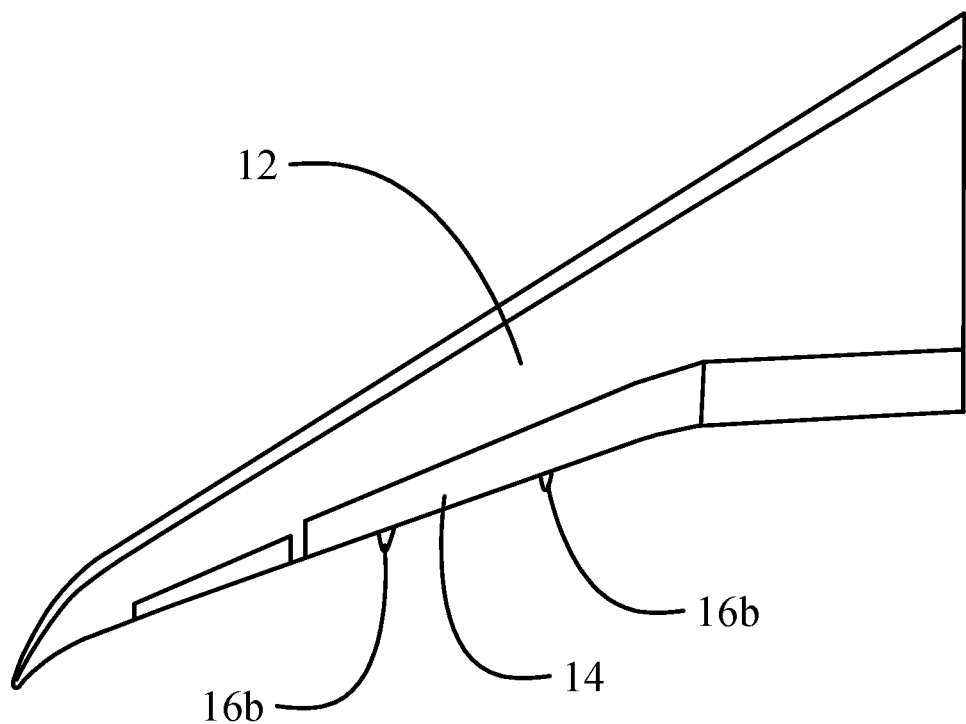
FIG. 1C is a top view of the wing and flaps of FIG. 1A.

Referring to the drawings, FIGS. 1A, 1B and 1C depict an aircraft 10 having a wing 12 with a system of operating flaps 14. The flaps 14 are engaged to the wing 12 at multiple attachment points with flap supports 15a, 15b at least partially housed within fixed fairings 16a and movable fairings 16b. The flaps 14 are deployed to enhance aerodynamic performance during takeoff and landing with a flap actuation mechanism 18, to be described in greater detail subsequently, that causes the flaps 14 and movable fairings 16b to rotate rearward and downward relative to the wing 12 as seen in FIG. 1B.

Figure 2A:
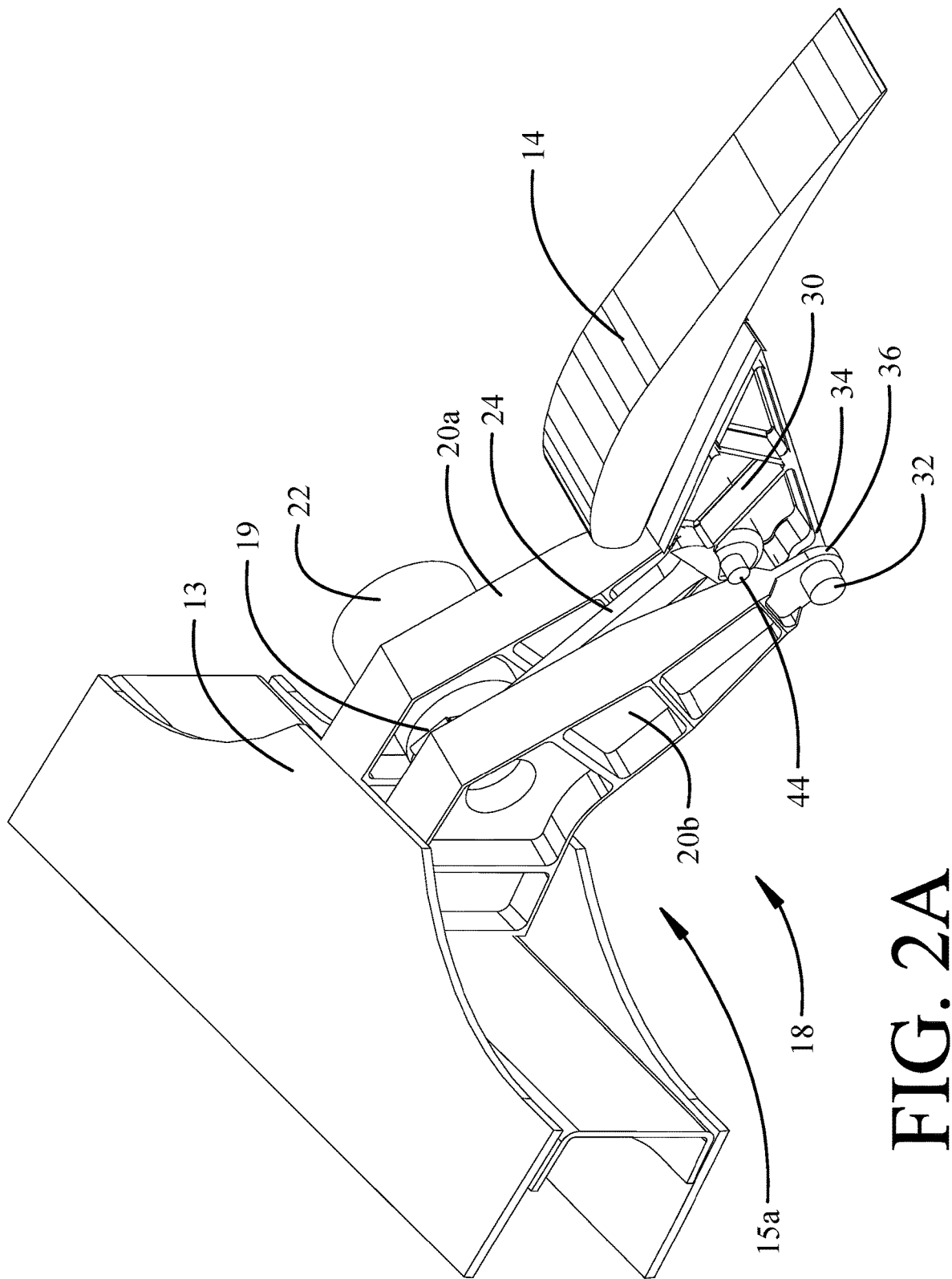
FIG. 2A is a rear pictorial view of a flap support with the fairings removed, the wing trailing edge removed and the flap sectioned to show an example implementation in the stowed position.
Figure 2B:
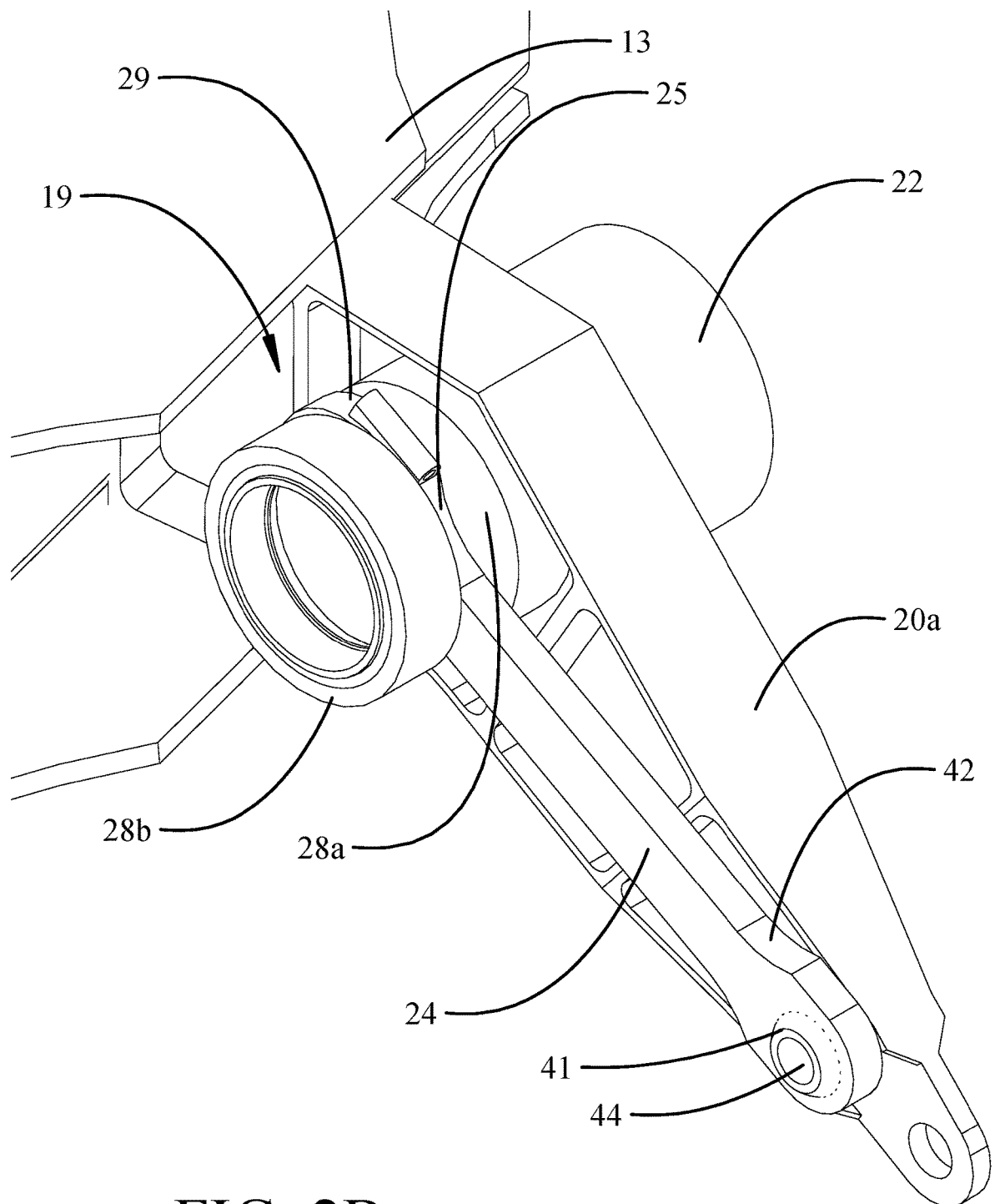
FIG. 2B is a rear pictorial view with the outboard rib of the flap support, the carrier beam and the flap removed to show the crankshaft assembly.
Figure 2C:
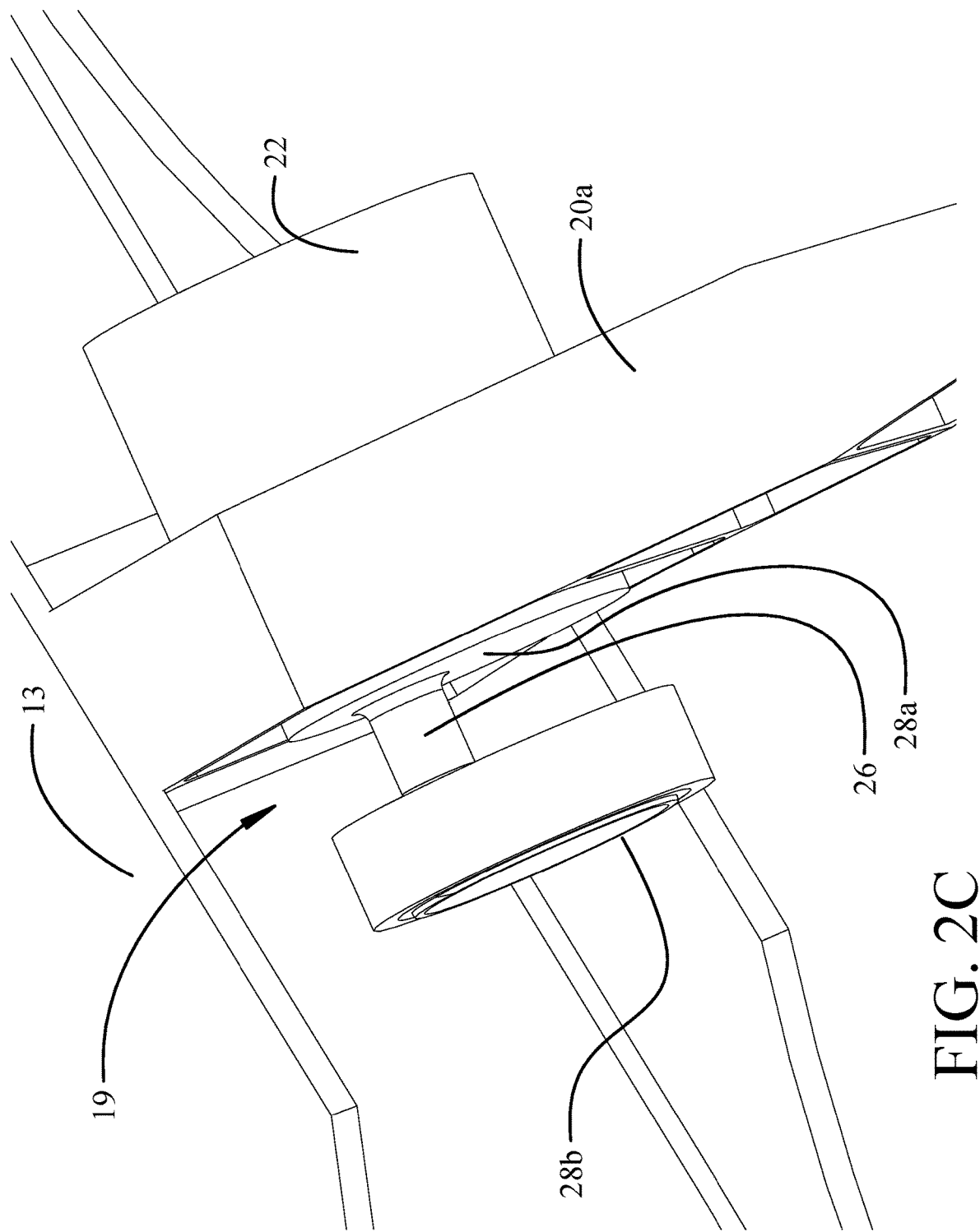
FIG. 2C is a detailed rear pictorial view with the coupler link removed to show the crankshaft.

FIGS. 2A-2C show details of an implementation of a flap actuation mechanism 18 employing an efficient crankshaft assembly 19. The flap supports 15a, 15b, extending from a wing structure 13 of the wing 12, each incorporate an inboard rib 20a and an outboard rib 20b. A rotary actuator 22, is supported by the inboard rib 20a to rotate the crankshaft assembly 19. As seen in FIG. 2B, a coupler link 24 is pivotally attached at a leading end 25 to a crankshaft 26 (seen in FIG. 2C) eccentrically extending between rotatable inboard and outboard cylindrical supports 28a, 28b in the crankshaft assembly 19. Rotation of the rotary actuator 22 rotates inboard and outboard cylindrical supports 28a, 28b and the crankshaft 26 to extend the coupler link 24. A split spherical bearing 27 or similar engagement element constrained by a rod end clamp 29 in the leading end 25 of the coupler link 24 may be employed to accommodate angular alignment.

The flap 14 is mounted on a carrier beam 30 and rotatably coupled through the flap support 15a, 15b to the wing structure 13. The carrier beam 30 is rotatably attached with an axle 32 at a lower vertex 34 to a trailing clevis 36 formed by the inboard and outboard ribs 20a, 20b of the flap support, the axle 32 defining a fixed axis of rotation relative to the wing 12 and flap support 15a, 15b for the carrier beam 30 and flap 14.

Figure 3:
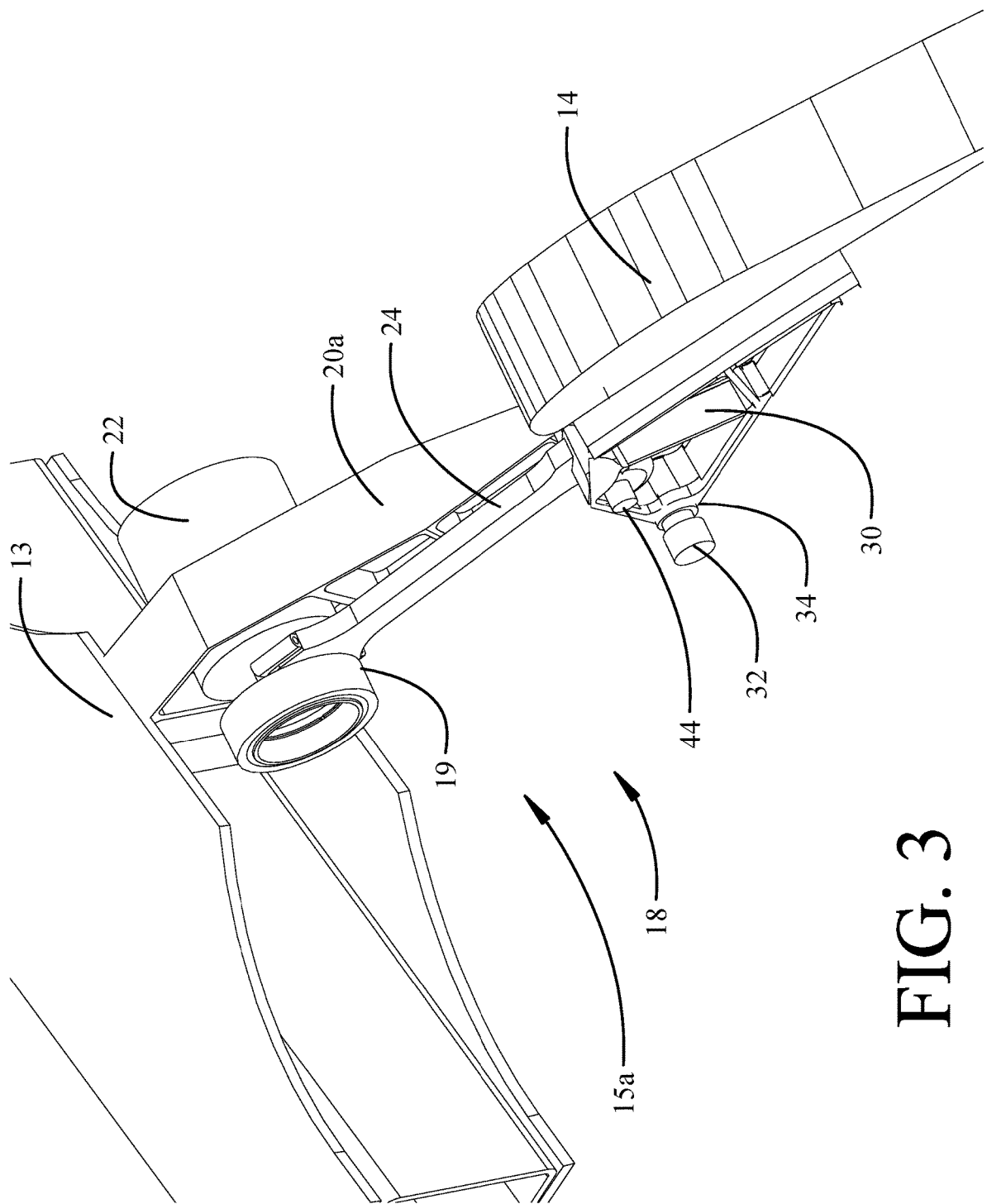
FIG. 3 is a rear pictorial with the outboard rib of the flap support removed showing the flap deployed.
Figure 4:
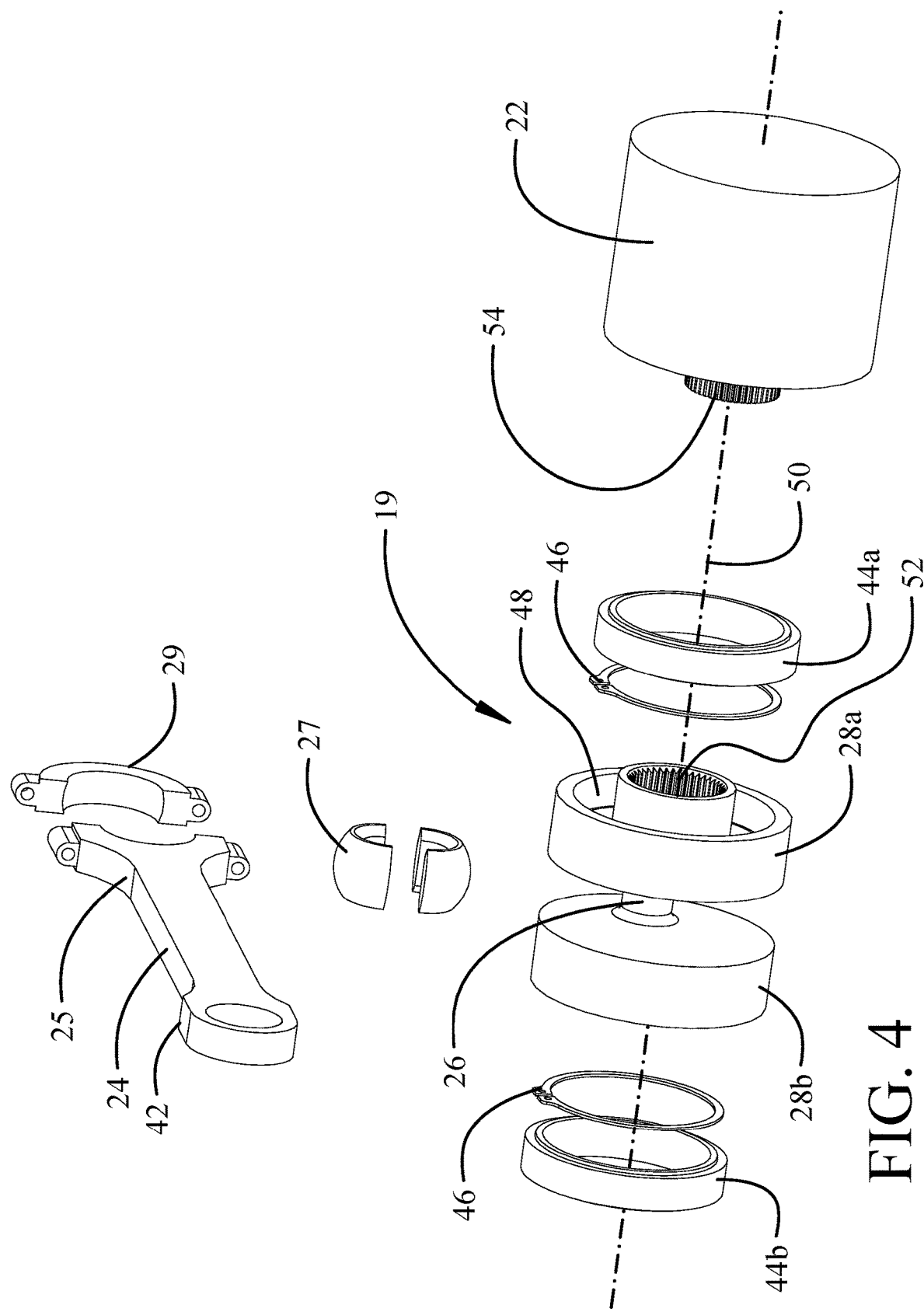
FIG. 4 is an exploded view of the crankshaft assembly, coupler link and rotary actuator for a first implementation.

The coupler link 24 extends from the crankshaft 26 to the carrier beam 30 and is pivotally attached to the carrier beam. In the example implementation, a trailing end 42 of the coupler link 24 is engaged with a pivot pin 44 to the carrier beam 30. To accommodate angular offsets, a second spherical bearing 41 or similar element in the trailing end 42 of the coupler link 24 may be employed as seen in FIG. 2B. Rotation of the carrier beam 30 about the axle 32 in response to translation of the coupler link 24 by rotation of the crankshaft 26 upon activation of the rotary actuator 22 deploys the flap 14 between a stowed position, seen in FIGS. 2A-2C, and a deployed position as seen in FIG. 3.

As seen in FIGS. 4 and 5A-5C for a first implementation, the crankshaft assembly 19 is rotatably supported in the inboard rib 20a with an inboard bearing 44a and in the outboard rib 20b with an outboard bearing 44b. The inboard and outboard bearings are constrained in the inboard and outboard ribs with spring clips 46 (as will be shown in greater detail subsequently). The inboard and outboard bearings are received in cylindrical cavities 48 in the inboard and outboard cylindrical supports 28a, 28b. The crankshaft assembly 19 rotates in the bearings 44a, 44b about an axis 50. A receiver 52, best seen in FIG. 5A, concentric with the axis 50 is adapted to engage a drive shaft 54 extending from the rotary actuator 22. For the example shown, the receiver 52 is internally splined and drive shaft 54 is externally splined. In alternative implementations a keyed arrangement or other constraining engagement between the receiver and drive shaft may be employed.

Figure 6A:
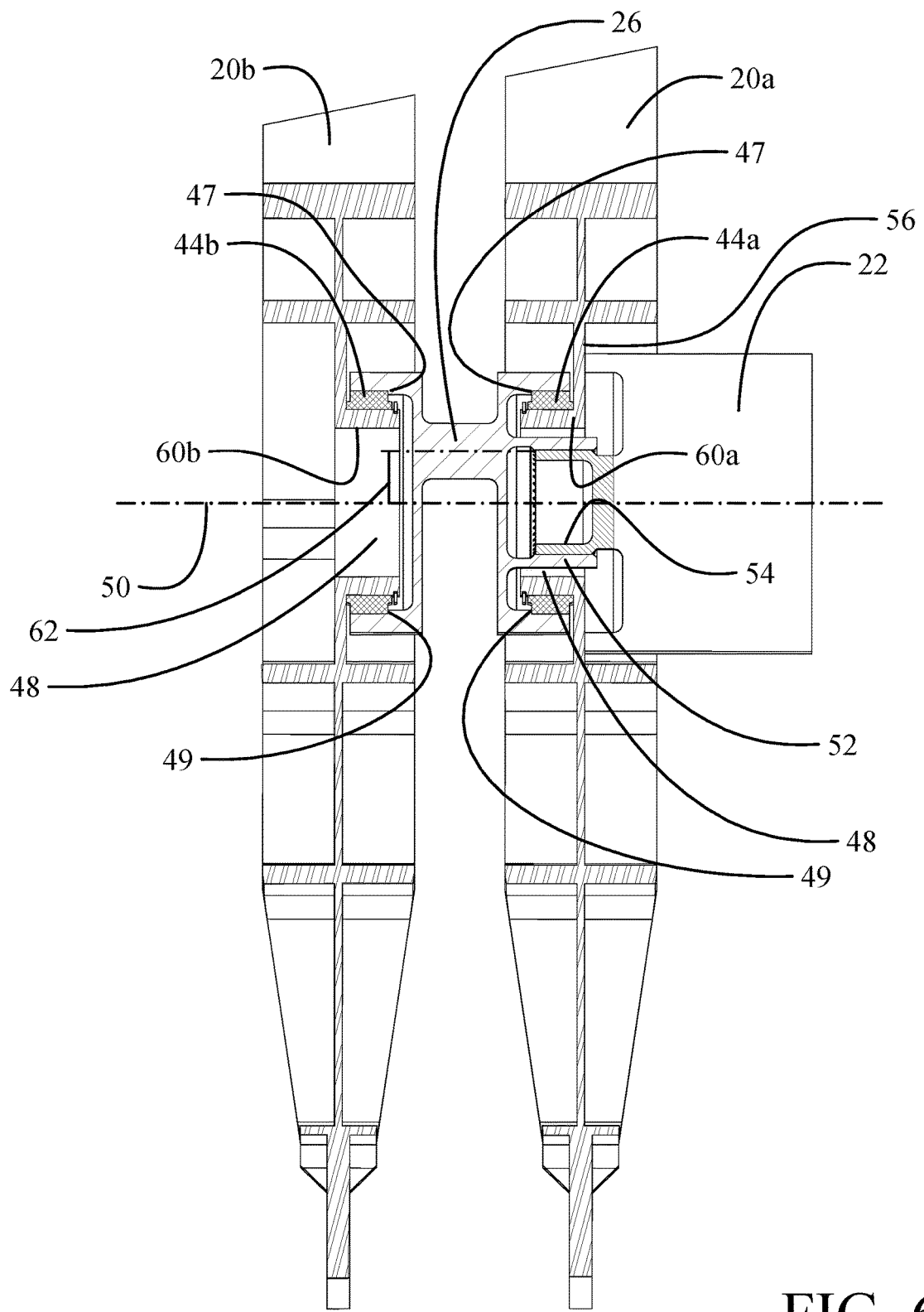
FIG. 6A is an upper rear section view of the flap support, crankshaft assembly and associated bearings in the first implementation.

An inboard cylindrical land 60a and an outboard cylindrical land 60b extending within the inboard and outboard ribs 20a and 20b, respectively, as seen in FIG. 6A, are concentrically received internal to the inboard and outboard bearings 44a, 44b, internal defined as at a smaller radius relative to the axis, to support the bearings in the ribs. The spring clips 46 secure the inboard and outboard bearings 44a, 44b on the inboard and outboard cylindrical lands 60a, 60b. The inboard and outboard cylindrical supports 28a, 28b are concentrically receive the inboard and outboard bearings 44a, 44b within the cavities 48 allowing rotation of the crankshaft assembly 19 between the inboard and outboard ribs 20a, 20b about the axis 50. Radial faces 49 in the cavities 48 constrain longitudinal motion with respect to the axis 50 between the crankshaft assembly 19 and the inboard and outboard bearings 44a, 44b. The rotary actuator 22 is mounted to in inboard surface 56 of the inboard rib 20a allowing the drive shaft 54 to be engaged within the receiver 52 concentric with the cylindrical lands 60a, 60b and the axis 50.

Figure 6B:
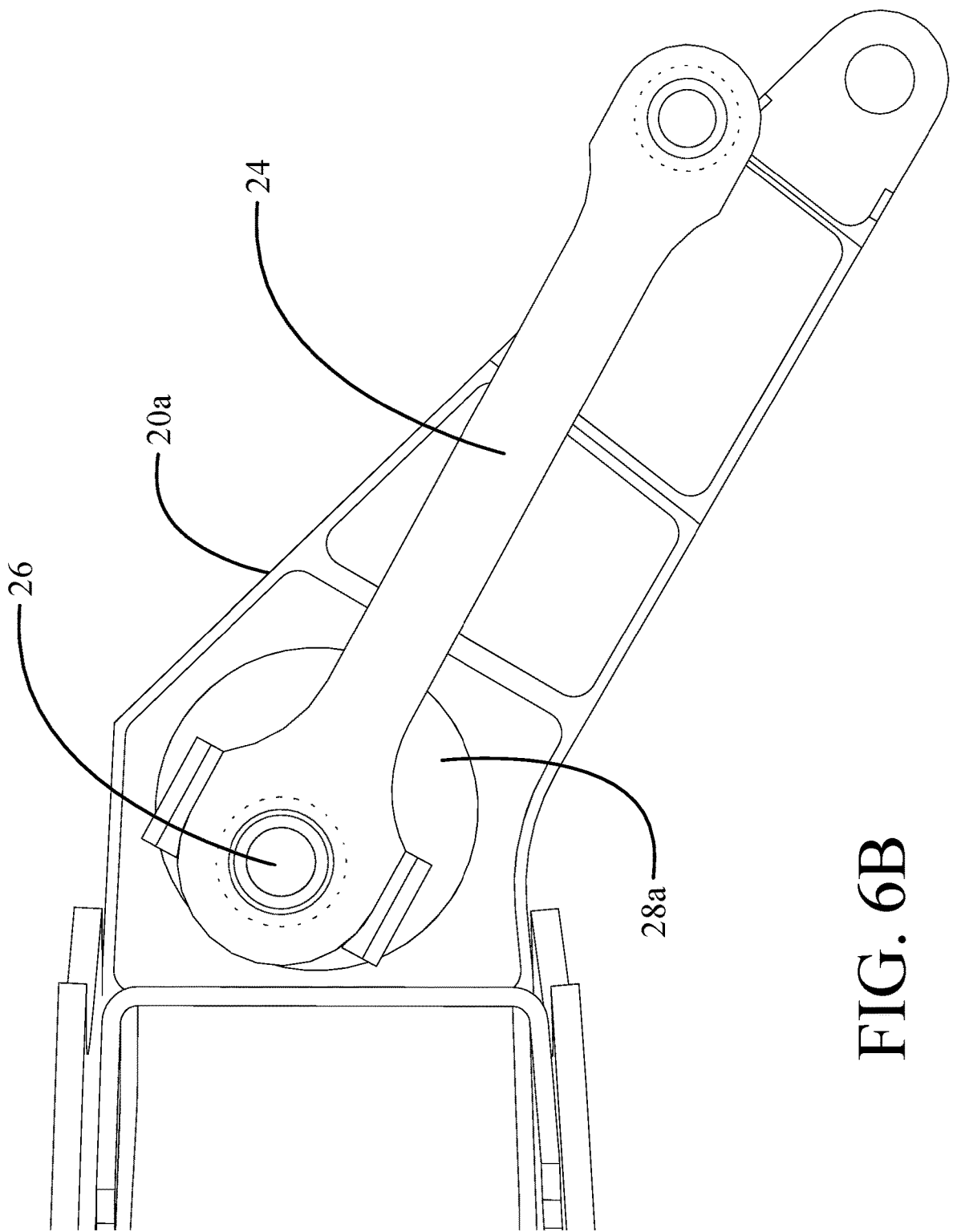
FIG. 6B is a side view showing the crankshaft assembly sectioned through the crankshaft at the first eccentric position and coupler link in the stowed position with the outboard rib, outboard bearing and outboard clip removed for clarity.
Figure 6C:
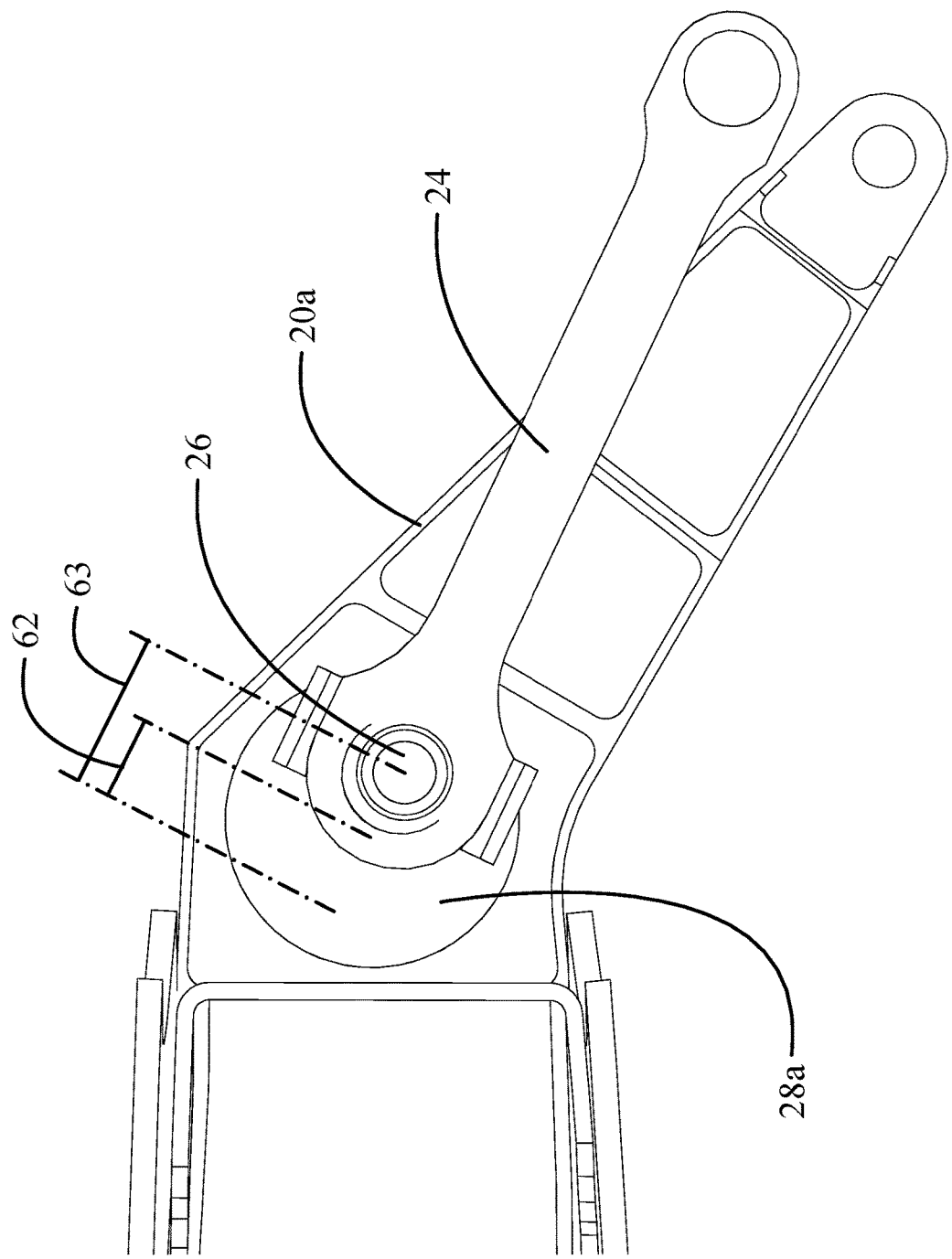
FIG. 6C is a side view showing the crankshaft assembly sectioned through the crankshaft at the second eccentric position and coupler link in the fully deployed position.

The crankshaft 26 rotates about axis 50 with an eccentric length 62 and provides 360° over-center rotation capability for translating the coupler link 24 as seen in FIGS. 6B and 6C. Eccentric support of the crankshaft 26 by the inboard and outboard cylindrical supports 28a, 28b allows the coupler link 24 to be translate between the inboard and outboard cylindrical supports at any position of the crankshaft 26. This configuration not only avoids issues of over-center interference present in prior actuation mechanisms but allows full translation of the coupler link 24 over a distance 63 of twice the eccentric length from a first eccentric position to a second eccentric position (shown in FIG. 6C) aligned with the first eccentric position at 180° of rotation allowing a smaller arcuate footprint requirement for the actuation mechanism and a shorter moment arm for reduced motor torque requirements. Additionally, deployment and retraction of the flap may be accomplished with a single direction of rotation of the rotary actuator 22, if desired.

Details of a second implementation of the flap actuation mechanism 18 employing an alternate configuration of the crankshaft assembly 119 are shown in FIGS. 7, 8A-8C and 9. As in the first implementation, the crankshaft assembly 119 is rotatably supported in the inboard rib 20a with an inboard bearing 144a and in the outboard rib 20b with an outboard bearing 144b. The outboard bearing 144b is constrained in the outboard rib with a spring clip 146. The crankshaft assembly 19 rotates in the bearings 144a, 144b about the axis 50. A receiving cavity 152, best seen in FIG. 8A, concentric with the axis 50 is adapted to engage a drive shaft 154 extending from the rotary actuator 22. For the example shown, the receiver 152 is internally splined and drive shaft 154 is externally splined. In alternative implementations a keyed arrangement or other constraining engagement between the receiver and drive shaft may be employed.

Figure 9:
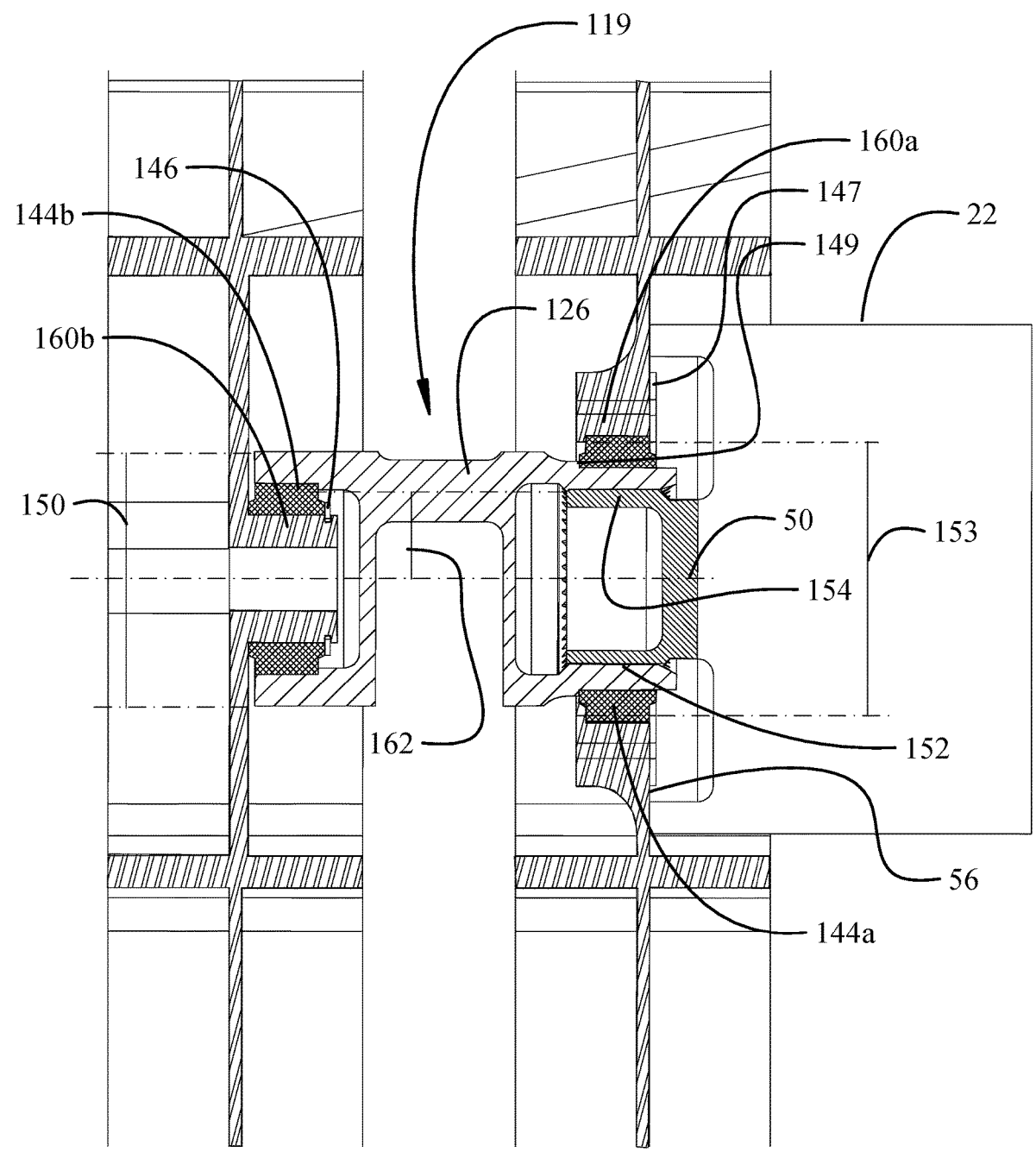
FIG. 9 is an upper rear section view of the flap support, crankshaft assembly and associated bearings in the second implementation; and, FIG. 10 is a flow chart of a method for deployment of a flap using the exemplary implementations.

An inboard cylindrical land 160a and an outboard cylindrical land 160b extend within the inboard and outboard ribs 20a and 20b, respectively, as seen in FIG. 9. The outboard bearing 144b is concentrically received over the outboard cylindrical land 160b and the outboard cylindrical support 128b is received over the outboard bearing 144b as in the initial implementation. The spring clip 146 secures the outboard bearing 144b on the outboard cylindrical land 160b. The inboard bearing 140a is concentrically received over the inboard cylindrical support 128a and engages a radial face 149 constraining longitudinal motion relative to the axis 50. Unlike the initial implementation, no concentric cavity surrounding the receiver is present in inboard cylindrical support 128a. The inboard cylindrical land 160a concentrically receives the inboard bearing 140a. A retaining ring 147 constrains the inboard bearing within the inboard rib 20a. As in the initial implementation, the inboard and outboard bearings 144a, 144b allow rotation of the crankshaft assembly 119 between the inboard and outboard ribs 20a, 20b about the axis 50. The rotary actuator 22 is mounted to in inboard surface 56 of the inboard rib 20a allowing the drive shaft 54 to be engaged within the receiver 52 concentric with the cylindrical lands 160a, 160b and the axis 50.

The configuration of the crankshaft assembly in the second implementation allows assembly from one side of the flap support 15a, 15b after mating of the inboard and outboard ribs 20a, 20b. The outboard cylindrical support 128b has an outer diameter 150 less than an internal diameter 153 of the inboard cylindrical land 160a whereby the outboard bearing 144b, sized to be received within the cylindrical cavity 148 in the outboard cylindrical support 128b is concentrically receivable through the inboard cylindrical land 160a or may be received between the inboard and outboard ribs 20a, 20b to be installed on the outboard cylindrical land 160b. Similarly, the spring clip 146 may then be received through the inboard cylindrical land 160a or between the inboard and outboard ribs and engaged to the outboard cylindrical land 160b. The crankshaft assembly 119 is insertable through the inboard cylindrical land 160b and the cylindrical cavity 148 concentrically positioned over the outboard bearing 144b. The inboard bearing 144a is then concentrically receivable between the inboard cylindrical land 160a and the inboard cylindrical support 128, to engage the radial face 149. The retaining ring 147 is then attached to the inboard cylindrical land securing the inboard and outboard bearings 144a, 144b and the crankshaft assembly 19 between the inboard and outboard ribs 20a, 20b. The rotary actuator 22 may then be secured to the inboard rib 20a with the drive shaft 154 received in the receiving cavity 152 in the inboard cylindrical support 128a.

Operation of the second implementation is substantially identical to the first implementations with the crankshaft 26 rotatable about axis 50 by an eccentric length 162 and providing 360° over-center rotation capability for translating the coupler link 24. This configuration also not only avoids issues of over-center interference present in prior actuation mechanisms but allows full translation of the coupler link 24 over a distance of twice the eccentric length allowing a smaller arcuate footprint requirement for the actuation mechanism and a shorter moment arm for reduced motor torque requirement. Additionally, deployment and retraction of the flap may be accomplished with a single direction of rotation of the rotary actuator 22, if desired.

Figure 10:
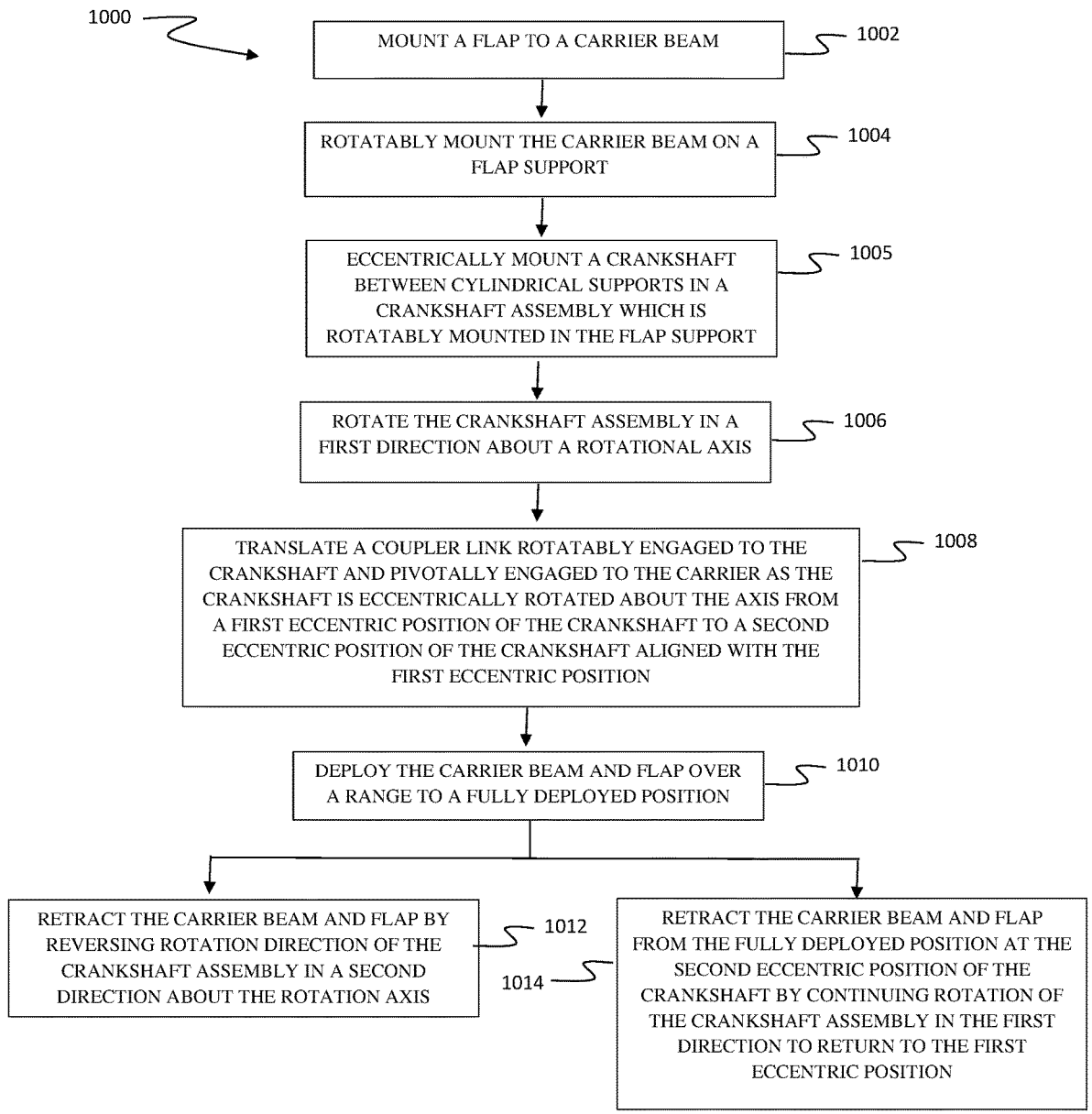

The implementations described provide a method 1000 for deploying a flap as shown in FIG. 10. A flap is mounted on a carrier beam, step 1002. The carrier beam is rotatably mounted on a flap support, step 1004. A crankshaft assembly having a crankshaft eccentrically mounted between cylindrical supports is rotatably mounted in the flap support, step 1005, and rotated in a first direction about a rotational axis, step 1006. A coupler link rotatably engaged to the crankshaft and pivotally engaged to the carrier beam is translated as the crankshaft is eccentrically rotated about the axis from a first eccentric position of the crankshaft to a second eccentric position of the crankshaft aligned with the first eccentric position, step 1108, and the carrier beam and flap are deployed over a range to a fully deployed position, step 1010. The carrier beam and flap are retracted by reversing rotation direction of the crankshaft assembly in a second direction about the rotation axis, step 1012. The flap may alternatively be retracted from the fully deployed position at the second eccentric position of the crankshaft by continuing rotation of the crankshaft assembly in the first direction to return to the first eccentric position, step 1014.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide. As used herein the terms "outboard" and "inboard" are employed to describe relative positioning and other than for the specific implementations disclosed may be reversed or substituted with appropriate descriptors such as "first" and "second", "top" and "bottom" or "right" and "left" depending on orientation of actual implementation.

What is claimed is:

1. A flap actuation mechanism comprising:
    a carrier beam on which a flap is mounted, the carrier beam rotatably mounted to a flap support for rotation relative to a wing;
    a crankshaft assembly rotatable about an axis and having a crankshaft eccentrically extending between an inboard cylindrical support and an outboard cylindrical support;
    a coupler link rotatably engaged to the crankshaft and, pivotally connected to the carrier beam, wherein rotation of the crankshaft between a first eccentric position and a second eccentric position translates the coupler link between a retracted position and a deployed position for the flap.

2. The flap actuation mechanism of claim 1 wherein the flap support comprises an inboard rib and an outboard rib and the crankshaft assembly is rotatably supported in the inboard rib with an inboard bearing and in the outboard rib with an outboard bearing and the crankshaft assembly rotates in the inboard and outboard bearings about the axis.

3. The flap actuation mechanism of claim 2 wherein the inboard and outboard bearings are received in cylindrical cavities in the inboard and outboard cylindrical supports.

4. The flap actuation mechanism of claim 3 wherein an inboard cylindrical land extends within the inboard rib and an outboard cylindrical land extends within the outboard rib and the inboard and outboard cylindrical lands are concentrically received internal to the inboard and outboard bearings.

5. The flap actuation mechanism of claim 4 wherein the inboard and outboard bearings are constrained in the inboard and outboard ribs with spring clips engaging the inboard and outboard cylindrical lands.

6. The flap actuation mechanism of claim 2 wherein
    an inboard cylindrical land extends within the inboard rib and an outboard cylindrical land extends within the outboard rib,
    the outboard bearing is concentrically received over the outboard cylindrical land and the outboard cylindrical support has a cylindrical cavity concentrically received over the outboard bearing,
    the inboard bearing is concentrically received over the inboard cylindrical support and engages a radial face constraining longitudinal motion of the crankshaft assembly relative to the axis, the inboard cylindrical land concentrically receiving the inboard bearing, and
    a retaining ring secures the inboard bearing within the inboard cylindrical land.

7. The flap actuation mechanism of claim 6 wherein the outboard bearing is constrained in the outboard rib with a spring clip engaging the outboard cylindrical land.

8. The flap actuation mechanism of claim 6 wherein the outboard cylindrical support has an outer diameter less than an internal diameter of the inboard cylindrical land whereby the outboard bearing is concentrically receivable through the inboard cylindrical land to be installed on the outboard cylindrical land, the crankshaft assembly is insertable through the inboard cylindrical land and the cylindrical cavity concentrically positioned over the outboard bearing, the inboard bearing is concentrically receivable between the inboard cylindrical land and the inboard cylindrical support to engage a radial face on the inboard cylindrical support.

9. The flap actuation mechanism of claim 2 wherein the inboard cylindrical support has a receiver concentric with the axis and further comprising a rotary actuator mounted to the inboard rib and having a drive shaft engaged in the receiver.

10. An aircraft having a flap system comprising:
a wing with a flap support;
a flap;
a carrier beam on which the flap is mounted, the carrier beam rotatably attached to the flap support;
a crankshaft assembly rotatable about an axis and having a crankshaft eccentrically extending between an inboard cylindrical support and an outboard cylindrical support;
a coupler link rotatably engaged to the crankshaft and pivotally connected to the carrier beam, wherein rotation of the crankshaft from a first eccentric position to a second eccentric position translates the coupler link to rotate the flap between a retracted position and a deployed position.

11. The aircraft having the flap system of claim 10 wherein the inboard cylindrical support has a receiver concentric with the axis and further comprising a rotary actuator mounted to an inboard rib of the flap support and having a drive shaft engaged in the receiver.

12. The aircraft having the flap system of claim 10 wherein the flap support comprises an inboard rib and an outboard rib and the crankshaft assembly is rotatably supported in the inboard rib with an inboard bearing and in the outboard rib with an outboard bearing and the crankshaft assembly rotates in the inboard and outboard bearings about the axis.

13. The aircraft having the flap system of claim 12 wherein the inboard and outboard bearings are received in cylindrical cavities in the inboard and outboard cylindrical supports, an inboard cylindrical land extends within the inboard rib and an outboard cylindrical land extends within the outboard rib and the inboard and outboard cylindrical lands are concentrically received, internal to the inboard and outboard bearings and the inboard and outboard bearings are constrained in the inboard and outboard ribs with spring clips engaging the inboard and outboard cylindrical lands.

14. The aircraft having the flap system of claim 12 wherein
an inboard cylindrical land extends within the inboard rib and an outboard cylindrical land extends within the outboard rib,
the outboard bearing is concentrically received over the outboard cylindrical land and the outboard cylindrical support has a cylindrical cavity concentrically received over the outboard bearing,
the inboard bearing is concentrically received over the inboard cylindrical support and engages a radial face constraining longitudinal motion of the crankshaft assembly relative to the axis, the inboard cylindrical land concentrically receiving the inboard bearing,
a retaining ring secures the inboard bearing within the inboard cylindrical land and
the outboard bearing is constrained in the outboard ribs with a spring clip engaging the outboard cylindrical land.

15. A method for deploying a flap, the method comprising:
rotating a crankshaft assembly having a crankshaft eccentrically mounted between cylindrical supports in a first direction about a rotational axis;
translating a coupler link rotatably engaged to the crankshaft and pivotally engaged to a carrier beam with an attached flap, as the crankshaft is eccentrically rotated about the rotational axis over a range from a first eccentric position of the crankshaft toward a second eccentric position of the crankshaft.

16. The method of claim 15 further comprising retracting the carrier beam and flap by reversing rotation direction of the crankshaft assembly in a second direction about the rotation axis.

17. The method of claim 15 further comprising deploying the carrier beam and flap to a fully deployed position at the second eccentric position aligned with the first eccentric position.

18. The method of claim 17 further comprising retracting the flap from the fully deployed position at the second eccentric position of the crankshaft by continuing rotation of the crankshaft assembly in the first direction to return to the first eccentric position.

19. The method of claim 15 further comprising:
mounting the flap on the carrier beam; and
rotatably mounting the carrier beam on a flap support.

20. The method of claim 19 further comprising:
rotatably mounting the crankshaft assembly in the flap support.

* * * * *